July 17, 1934.                B. B. ROCHLUS                1,966,971
              MODEL SELECTOR AND STYLE INDICATOR
                    Filed Feb. 13, 1933    3 Sheets-Sheet 2

Inventor
BENJAMIN B. ROCHLUS.

July 17, 1934.   B. B. ROCHLUS   1,966,971
MODEL SELECTOR AND STYLE INDICATOR
Filed Feb. 13, 1933   3 Sheets-Sheet 3
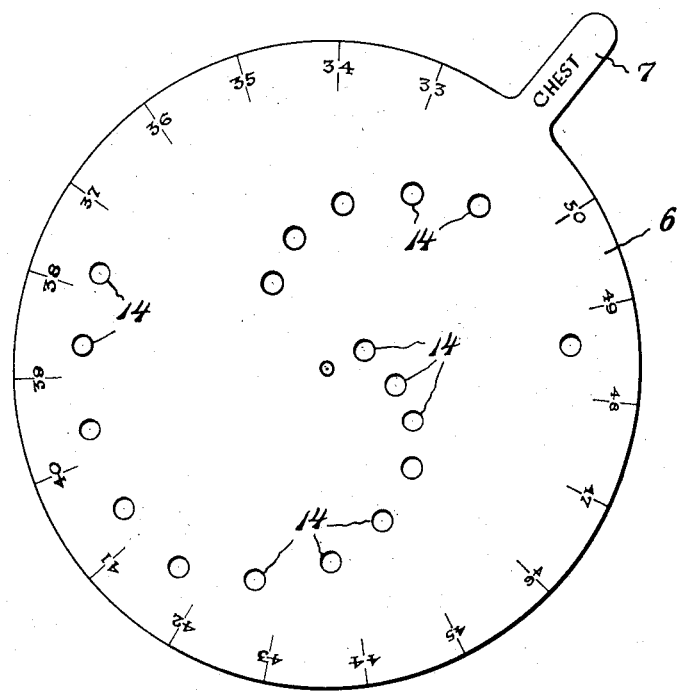
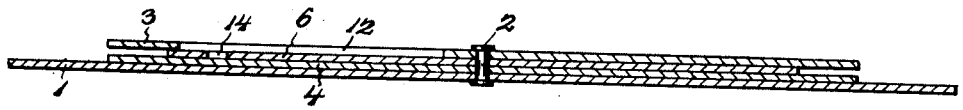
Inventor
BENJAMIN B. ROCHLUS.
By Robt R Robt
Attorneys Patented July 17, 1934

1,966,971

UNITED STATES PATENT OFFICE 1,966,971

MODEL SELECTOR AND STYLE INDICATOR

Benjamin B. Rochlus, Cleveland, Ohio

Application February 13, 1933, Serial No. 656,627

2 Claims. (Cl. 40—70)

A very considerable amount of the large business done today in men's tailoring involves the merchandising of wearing apparel, principally men's suits, by salesmen representing the clothing manufacturer, said salesmen selling direct to customers remote from the point of manufacture of the garments, and each salesman measuring the particular customer so that the suit purchased will be one measured to order.

The above method of merchandising measured to order garments by salesmen remote from the place of manufacture involves certain definite problems. Each manufacturer produces a large number of styles of garments, for instance. These styles are called models, and are usually presented in style books, at least one of which is supplied to a salesman so that he may exhibit the various styles of clothing sold by him, to his prospective purchaser.

The various models of the styles of clothing produced by the manufacturer are classified in the style books under group classifications. As an example, the models of wearing apparel for young men are classified under "young men's styles" which may be "group 1" in the sales exhibit book. "Group 2" may include the models of the "semi-conservative styles" suitable for a certain class of men. Another group of models may, and usually are, classified as "conservative styles" that comprise "group 3". Then there are models classified under "group 4" as "stout styles" and usually models classified under still an additional "group 5" as "semi-stout styles".

It is obvious that it is desirable that the customer be supplied by the salesman with a certain model of suit, or wearing apparel, whatever it may be, which is particularly designed in view of the measured proportions of the person to be fitted. In other words, a conservative style model is not usually desirable to sell to a young man. Moreover, a young man's style is not the best or most appropriate model to sell to an elderly man, who would best be suited by a conservative model.

The largest problem in the merchandising of the wearing apparel by the salesman's measurements of the tailored to order suits, overcoats, or other wearing apparel, is to obtain a service from the salesman involving the necessary competency and intelligence such that the customer will be caused to purchase a model of wearing apparel that is most suited to his needs by reason of the proportions of his body, a model that will fit him properly, and with which he will be ultimately satisfied when the tailored garment has been delivered. If this matter is left to the salesman's discretion, difficulty ensues, because different salesmen have different ideas as to the proper models and many salesmen are persuaded by the customer to sell a model not fitted to the needs of the customer, which model, when delivered, is not satisfactory, making it necessary to return it to the manufacturer for alterations to give satisfaction to the purchaser.

With the foregoing understanding of the commercial merchandising of the tailored wearing apparel such as referred to, the object of the present invention has been to provide a mechanically operable device in the nature of a model selector and style indicator that is susceptible of actuation so as to be adjusted to indicate certain measurements of the person or customer to be fitted, which measurements when considered in their practical relation to the tailoring requirements, control the particular style which will be best adapted for the proper fitting of the customer dealt with.

The device of the invention is so designed that when adjusted to give the controlling measurement of the waist of the customer and the controlling measurement of the chest of the customer, there will be selected or set up an indication of the proper style or model of the particular wearing apparel that is according to the manufacturer's customary specifications most suited to the need of the said customer.

With the foregoing in view, I have empirically determined in view of my knowledge of the science of tailoring of garments that when the high waist and chest measurements of a person are determined a knowledge of these measurements is the determining factor in the selection of a particular model of suit, overcoat, or the like, that will be most appropriate and will best fit a customer purchasing such wearing apparel, having the said measurements. Of course, these measurements are almost never the same for any two or three persons consecutively measured, and varying as they do, it is necessary that the indicating device of my invention deal with different combinations of such measurements so as to point out, after adjustment of the device, the proper style or model of wearing apparel that the manufacturer most desires to produce to meet the need of the particular person to whom the garment is sold.

In line with the foregoing, therefore, my model selecting and style indicating device comprises, in its general organization, a chest measurement element, a waist measurement element, each of which carries indicia of the measurements of minimum and maximum range of persons to whom a tailored garment is generally supplied.

My device also embodies indicia classifying in various groups, preferably suitably numbered, the different models of garments that fall within each particular group of such classifications as previously mentioned, which I repeat as follows:—

1. "Young men's styles"
2. "Semi-conservative styles"
3. "Conservative styles"
4. "Stout styles"
5. "Semi-stout styles"

These groups of classifications are given any suitable indication so far as the particular mode of indicating them may be concerned, as will correspond with the particular groups in the salesman's exhibit book, and the various models being always numbered, my device will bear in each group classification the numbers of the models that fall within the style group.

My invention additionally embodies group indicating indicia, which are peculiarly related to the measurement indicia carried by the waist measurement element or part. The group indicating indicia have been developed by me in accord with the knowledge of the expert tailoring which has disclosed the particular styles classified in the various groups, which styles best accord with the requirements of selected waist and chest measurements of a customer.

The selecting and indicating device of my invention, having in view the accomplishment of the above objections, does away with leaving to the discretion of a salesman the particular style of the wearing apparel to be sold to his customer. If my selecting and indicating device is operated and adjusted in accord with the particular waist and chest measurments obtained when measuring the customer, there will be a mechanical selection of the particular group of styles, by the actual number of the group being presented to the view of the salesman and the customer, thus indicating definitely and positively the range of styles or models that should be offered to the customer for purchase.

I now proceed to describe the details of my model selecting and style indicating device, in conjunction with the accompanying drawings, in which:

Figure 3 is a plan view of the chest measuring dial illustrating the special arrangement of openings that enable the group indicating indicia upon the waist measuring dial to become visible and used for purposes of selection of the proper style or model when the chest and waist measurements have been ascertained and indicated by the apparatus.

Figure 5 is a sectional view taken about on the line 5—5 of Figure 1.

Figure 1:
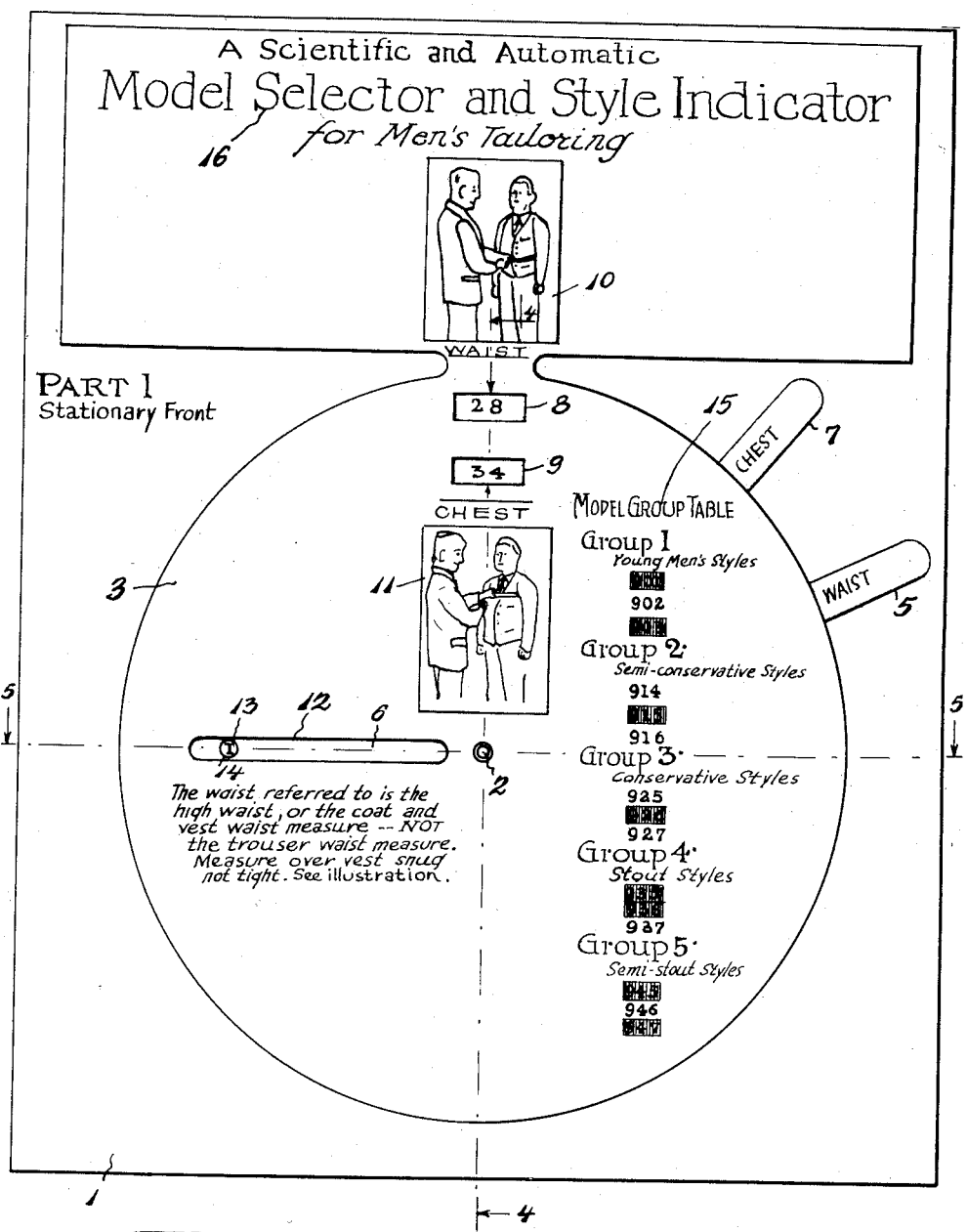
Figure 1 is a plan view of my invention with the parts thereof adjusted to indicate a particular waist and a particular chest measurement of a certain person, the adjustment presenting to the view a style or model group number and thus indicating the models of the garments that are suited to the figure and proportions of the customer being fitted.
Figure 2:
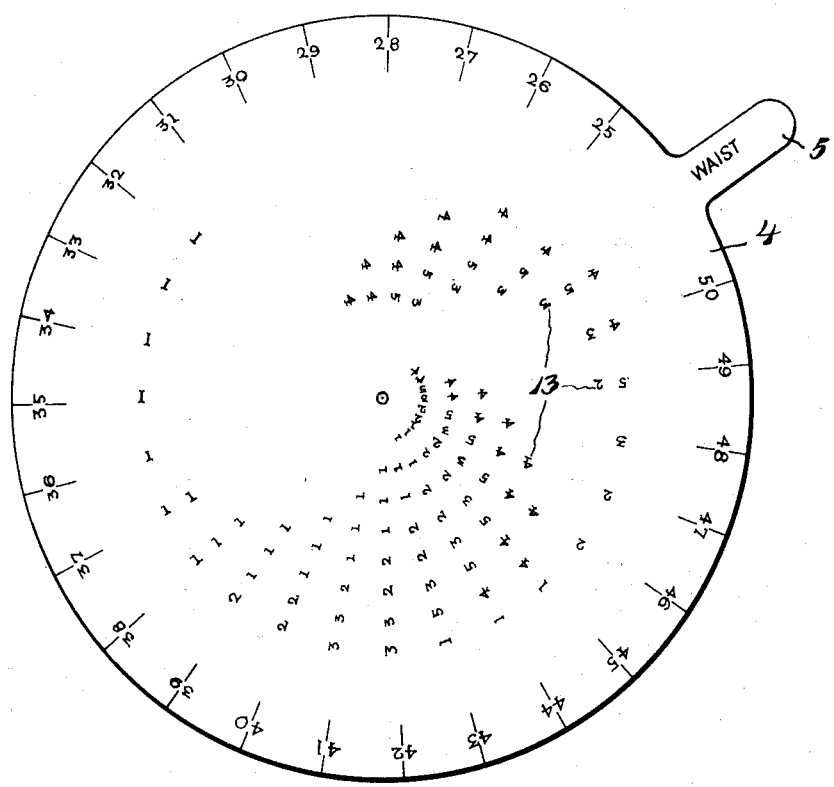
Figure 2 is a plan view of the waist measuring dial showing not only the measuring data thereof, but the group selecting indicia thereon.
Figure 4:
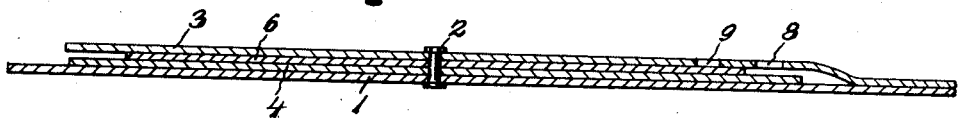
Figure 4 is a sectional view taken on about the line 4—4 of Figure 1.

Specifically describing my invention, I refer first to Figure 1 of the drawings. A base of heavy cardboard, wood, or any other suitable material, is used to carry the indicating dials and cover plate or member, housing or extending over said dials which are rotatively mounted upon an axis member 2 which extends upwardly from the base 1 through the dials and the cover plate or member, the latter designated 3. The waist dial is designated at 4, equipped with a handle 5 and is supported directly upon the base. The chest dial is designated 6, equipped with a handle 7, and superimposed upon the dial 4 intermediate the dial and the cover plate or member 3. The handles 5 and 7 of the dials may be of any suitable structure. The dials 4 and 6 themselves may be made of any desired material such as metal, wood, heavy cardboard or the like. At the upper portion of the cover plate 3, is a sight opening 8 at which waist measurements on the waist dial 4 will appear during rotation of said dial. Below the sight opening 8 is another sight opening 9 at which chest measurements will appear when the chest dial is adjusted to different measurements of the person being fitted. I associate with the waist measurement sight opening 8 an illustration of waist measurement designated 10, though this is not absolutely necessary. Similarly, I associate preferably with the chest measurement sight opening 9 an illustration 11 showing the action of measuring the chest of a person to be fitted. The cover plate or member 3 is additionally equipped with an elongated sight opening 12 intentionally made of its particular dimensions so that any one of a series of numbers of the group or style indicia 13 carried by the waist dial 4, may appear at the opening 12 for the purposes of the group indicating function of the apparatus of the invention. To enable the said numbers or group indicia 13 to appear at the opening 12, the chest indicating dial 6 is formed with peculiarly arranged openings 14 that are designed to enable the exposing of the indicia 13 at the sight opening as above suggested.

Associated with and preferably, though not necessarily borne directly by, the cover plate 3 is a model group table designated 15 in Figure 1. In this model group table are arranged classifications of models according to styles, in groups which are designated "group 1", "group 2", "group 3", "group 4" and "group 5". "Group 1" is entitled "young men's styles", "group 2" is entitled "semi-conservative styles", "group 3" is entitled "conservative styles", "group 4" is entitled "stout styles", and "group 5" is entitled "semi-stout styles". There may, of course, be additional style group classifications but those given are customarily employed and are sufficient for the purposes of disclosing my invention. I prefer that the handles 7 of the chest dial shall carry the designation "Chest" thereon, and similarly, that handle 5 of the waist dial shall carry the "Waist" designation thereon, as shown in the drawings. The base 1, or the cover member 3, of my apparatus may bear any suitable title, as shown at 16, that preferably given being "A scientific and automatic model selector and style indicator for men's tailoring", but it is obvious that this title may be changed.

All that is necessary and desirable is a suitable title that will be useful for indicating the purposes of the device both to the customer and to the salesman.

With the foregoing understanding of the construction of my invention the operation thereof will now be set forth.

A salesman in dealing with his customer presents to the customer the illustrations of styles in the sales style exhibit book. When the customer is convinced that the salesman has wearing apparel desired to be ordered and tailored to the measure of the customer, the salesman will preferably suggest that he take the waist and chest measurement called for by his model selector and style indicating apparatus which may be exhibited to the customer so that the customer may know the purpose thereof.

I will say, for instance, that the customer's high waist measurement is 28 inches and his waist measurement is 34 inches. The waist dial 4 is adjusted by manipulation of its handle 5 to bring the waist measurement 28 to the sight opening 8. The chest dial 6 is manipulated by its handle 7 to bring the chest measurement to the sight opening 9. These manipulations of the two dials cause a group number "1", in the present instance, to appear at the long sight opening of the cover member 12. This last indication is the model or style group indication showing to the customer and to the salesman that in view of the measurements of the customer, obtained as above indicated, the styles or models of clothes suitable for the customer's size and shape fall in "group 1". "Group 1" is the group of "young men's styles" or models as actually indicated by the cover member 3 or the indicia 15 conveniently found on said cover member or on the base 1, the number being immaterial. Now under each group of the group indicia 15 are various numbers of the models or styles which are found in the style exhibit book that the salesman has shown to the customer. There are certain styles or models which the manufacturer usually wants to sell in preference to others. These particular styles or models have the numbers thereof indicated in red and the salesman will have in mind that if possible he should have the customer select one of the preferred models or styles indicated by the red numbers as shown in Figure 1. The numbers of the models in the "young men's styles" run according to the apparatus, now described as follows: "901"—"902"—"903". The numbers "901" and "903" will be printed in red, or some other distinctive color, as compared with the number "902". The salesman will, therefore, endeavor to have the customer select the model "901", or the model "903". The "waist" dial 4 contains waist sizes running preferably from 25 inches to 150 inches, and when the dial is turned by its handle 5 any of these waist sizes can be made to appear at the sight opening 8, of Figure 1. The chest dial contains indicia of chest sizes from 33 inches to 50 inches, which is the customary range, and when said dial is turned by its handle 7 any of these sizes can be made to appear at the sight opening 34. The holes 14 of the chest dial can be arranged to conform to any model group number on the dial 4 which may represent any proportions in sizes, between the chest and waist measurements.

The model selector and style indicator of my invention will be, of course, provided with indicia corresponding with the model group numbers or indicia of the particular manufacturer's style book used by the salesman and the model numbers under each group will also conform with the manufacturer's numbers as used in said style book.

By the employment of my invention, there is eliminated the likelihood of the loss which is incurred today by manufacturers incident to rejected garments. The rejections are very largely due to the salesman permitting his customer to order the wrong model of the garment.

My invention also avoids the cost of alterations at the branch office and/or factory. By the use of my model selecting and style indicating apparatus, salesmen will be given confidence and definite information, in recommending styles which they know are appropriate for the use of the customer, thus making the selling of the particular styles or models easier. Furthermore all guess work in regard to precise and proper selections of correct models and styles is eliminated by my invention, and the need of having check-ups made by check-up men at the factory, for the above reason, will be greatly reduced.

By specifying certain preferred style numbers to be sold in red, or some distinctive color, in each model group carried by the apparatus, the salesmen will be informed definitely as to the particular styles that the house he represents wants to sell, these usually being models which are less costly to manufacture. Finally, this apparatus, by enabling mechanical selection of styles or models, is helpful to reduce the expense involved on the part of manufacturers or the selling clothiers, incident to training of salesmen to handle the measurements of the customer properly.

Having thus described my invention, What I claim as new and desire to secure by Letters Patent of the United States, is:—

1. In the art of measured to order wearing apparel, in combination, a garment model or style indicating device comprising a model selector and style indicator for use in the art of measured to order garment manufacture, the same comprising in combination, a base, a cover member secured in a stationary manner on said base provided with sight openings arranged one above the other at which measurement indications may appear and also provided with an elongated sight opening at which a group designation may appear, a model group table carried by the cover member and including classified indicia of different models under group classifications having different designations, a waist measurement dial having waist measurement indicating numbers movably mounted under said cover member and adjustable so that one waist measurement indication at a time may be brought to view at one of the sight openings provided therefor in the cover, a manipulating part for said dial, a chest measurement dial associated with the said cover member and overlying said cover and having chest measurement numbers adapted to be brought to view one at a time at the sight opening aforesaid provided therefor, a manipulating part for the chest measurement dial, model group indicia including group designations corresponding with the designations of the various classified groups of models above mentioned, said model group indicia being movable to bring one of the model group designations to view at the sight opening provided therefor as aforesaid incident to the adjustment of the waist measurement dial and the chest measurement dial in proper relative positions for indicating the waist and chest measurements of the prospective customer to be fitted, said chest measurement dial having sight openings therein adapted to register with one of the openings in the cover and with indicia on the waist measurement dial.

2. In a style indicator selector, the combination of a base member, a disc superposed thereon and having a plurality of series of indicia, a second disc superposed on the first disc and having a single series of indicia and a single series of sight openings arranged in substantially S-form, a third disc superposed on said second disc and being relatively immovable with respect to said base member, a pair of sight openings in said last named disc located one above the other, and an elongated sight opening on the face of said last named disc arranged upon the median line of said disc and wherein the sight openings of the second disc appear alternatively, and by virtue of the S-form arrangement progress across the elongated sight opening as the disc is rotated, said combination of parts being of such a nature that the indicia of said first named disc will appear at certain times in one of the two small openings of the third disc simultaneously with the appearance of indicia in the sight opening of the second disc and in the elongated opening of the third disc, and indicia on the second disc will appear in one of the small sight openings of the third disc.

BENJAMIN B. ROCHLUS.